(12) United States Patent
Kachmar

(10) Patent No.: US 8,944,702 B2
(45) Date of Patent: Feb. 3, 2015

(54) FIBER OPTIC CONNECTOR WITH FIBER TAKE-UP REGION

(75) Inventor: Wayne M. Kachmar, North Bennington, VT (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 13/455,249

(22) Filed: Apr. 25, 2012

(65) Prior Publication Data

US 2012/0328247 A1    Dec. 27, 2012

Related U.S. Application Data

(60) Continuation of application No. 12/849,633, filed on Aug. 3, 2010, now abandoned, which is a division of application No. 12/433,081, filed on Apr. 30, 2009, now Pat. No. 7,766,556, which is a division of application No. 11/735,267, filed on Apr. 13, 2007, now Pat. No. 7,534,050.

(51) Int. Cl.
G02B 6/36        (2006.01)
G02B 6/38        (2006.01)

(52) U.S. Cl.
CPC ............ *G02B 6/3806* (2013.01); *G02B 6/3846* (2013.01)
USPC .................... 385/83; 385/55; 385/56; 385/57

(58) Field of Classification Search
USPC .......................................... 385/83, 55, 56, 57
See application file for complete search history.

(56) References Cited

U.S. PATENT DOCUMENTS

| | | |
|---|---|---|
| 3,395,244 A | 7/1968 | Koehler |
| 4,050,783 A | 9/1977 | Tardy |
| 4,190,316 A | 2/1980 | Malsby et al. |
| 4,225,214 A | 9/1980 | Hodge et al. |
| 4,291,941 A | 9/1981 | Melzer |
| 4,309,071 A | 1/1982 | Prunier |
| 4,320,938 A | 3/1982 | Gunnersen et al. |

(Continued)

FOREIGN PATENT DOCUMENTS

| | | |
|---|---|---|
| EP | 0 479 415 A2 | 4/1992 |
| EP | 0 689 070 A1 | 12/1995 |

(Continued)

OTHER PUBLICATIONS

International Search Report and Written Opinion for PCT/US2012/029241 mailed Sep. 25, 2012.

*Primary Examiner* — Kaveh Kianni
(74) *Attorney, Agent, or Firm* — Merchant & Gould P.C.

(57) ABSTRACT

A fiber optic connector assembly includes a connector and a carrier. The connector, defining a longitudinal bore extending through the connector and having a first end region and a second end region, includes a ferrule assembly, having an optical fiber extending through the connector, at least partially disposed in the longitudinal bore at the first end region, a tube, defining a passage and having a first end portion disposed in the longitudinal bore at the second end region and a second end region, and a spring disposed in the bore between the ferrule assembly and the tube. The carrier includes a cable end and a connector end engaged with the connector, a termination region disposed between the connector end and the cable end, a fiber support region disposed between the connector end and the termination region, and a take-up region disposed between the connector end and the fiber support region.

29 Claims, 3 Drawing Sheets

(56) References Cited

U.S. PATENT DOCUMENTS

| | | | | |
|---|---|---|---|---|
| 4,373,777 | A | 2/1983 | Borsuk et al. | |
| 4,588,256 | A | 5/1986 | Onstott et al. | |
| 4,669,820 | A * | 6/1987 | Ten Berge | 385/78 |
| 4,746,194 | A | 5/1988 | Rasmussen | |
| 4,787,699 | A | 11/1988 | Moulin | |
| 4,807,958 | A | 2/1989 | Gunner et al. | |
| 4,850,671 | A | 7/1989 | Finzel | |
| 4,984,865 | A | 1/1991 | Lee et al. | |
| RE34,005 | E | 7/1992 | Levinson et al. | |
| 5,151,961 | A * | 9/1992 | Hvezda et al. | 385/60 |
| 5,261,019 | A | 11/1993 | Beard et al. | |
| 5,317,633 | A | 5/1994 | Hiraiwa | |
| 5,321,784 | A | 6/1994 | Cubukciyan et al. | |
| 5,390,272 | A | 2/1995 | Repta et al. | |
| 5,418,876 | A | 5/1995 | Lee | |
| 5,446,819 | A | 8/1995 | Foster et al. | |
| 5,469,521 | A | 11/1995 | Coutts et al. | |
| 5,611,017 | A | 3/1997 | Lee et al. | |
| 5,631,986 | A | 5/1997 | Frey et al. | |
| 5,647,043 | A * | 7/1997 | Anderson et al. | 385/78 |
| 5,802,230 | A * | 9/1998 | Kuribayashi et al. | 385/92 |
| 5,806,175 | A * | 9/1998 | Underwood | 29/748 |
| 5,862,282 | A | 1/1999 | Matsuura et al. | |
| 5,883,988 | A * | 3/1999 | Yamamoto et al. | 385/14 |
| 5,883,995 | A | 3/1999 | Lu | |
| 5,915,056 | A | 6/1999 | Bradley et al. | |
| 5,960,141 | A * | 9/1999 | Sasaki et al. | 385/88 |
| 6,054,007 | A | 4/2000 | Boyd et al. | |
| 6,079,880 | A * | 6/2000 | Blom | 385/60 |
| 6,142,676 | A | 11/2000 | Lu | |
| 6,179,658 | B1 | 1/2001 | Gunay et al. | |
| 6,325,670 | B2 | 12/2001 | Murayama | |
| 6,341,898 | B1 * | 1/2002 | Matsushita | 385/88 |
| 6,419,402 | B1 | 7/2002 | Zimmel | |
| 6,432,511 | B1 | 8/2002 | Davis et al. | |
| 6,456,768 | B1 * | 9/2002 | Boncek et al. | 385/100 |
| 6,513,989 | B1 * | 2/2003 | Bleck et al. | 385/60 |
| 6,543,941 | B1 * | 4/2003 | Lampert | 385/58 |
| 6,782,182 | B2 | 8/2004 | Dautartas et al. | |
| 6,811,321 | B1 * | 11/2004 | Schmalzigaug et al. | 385/59 |
| 6,811,323 | B2 | 11/2004 | Murray et al. | |
| 6,819,858 | B2 | 11/2004 | Steinberg et al. | |
| 6,848,837 | B2 | 2/2005 | Gilligan | |
| 6,893,591 | B2 | 5/2005 | Davis et al. | |
| 6,913,394 | B2 * | 7/2005 | Iwano et al. | 385/78 |
| 6,945,706 | B2 | 9/2005 | Gimbel et al. | |
| 7,147,384 | B2 | 12/2006 | Hardcastle et al. | |
| 7,147,385 | B2 | 12/2006 | Zimmel et al. | |
| 7,467,896 | B2 * | 12/2008 | Melton et al. | 385/87 |
| 7,490,994 | B2 | 2/2009 | Scadden et al. | |
| 7,534,050 | B2 | 5/2009 | Kachmar | |
| 7,578,623 | B2 * | 8/2009 | Wang et al. | 385/88 |
| 7,677,812 | B2 | 3/2010 | Castagna et al. | |
| 7,758,256 | B2 | 7/2010 | Hopkins et al. | |
| 7,766,556 | B2 | 8/2010 | Kachmar | |
| 7,802,926 | B2 * | 9/2010 | Leeman et al. | 385/86 |
| 7,918,609 | B2 * | 4/2011 | Melton et al. | 385/59 |
| 2001/0010741 | A1 * | 8/2001 | Hizuka | 385/55 |
| 2001/0033730 | A1 * | 10/2001 | Fentress | 385/139 |
| 2002/0067894 | A1 | 6/2002 | Scanzillo | |
| 2002/0090179 | A1 * | 7/2002 | Iwano et al. | 385/78 |
| 2002/0154868 | A1 | 10/2002 | Kraus et al. | |
| 2003/0031447 | A1 | 2/2003 | Nault | |
| 2003/0063868 | A1 * | 4/2003 | Fentress | 385/78 |
| 2004/0057672 | A1 | 3/2004 | Doss et al. | |
| 2005/0135755 | A1 * | 6/2005 | Kiani et al. | 385/78 |
| 2005/0213899 | A1 * | 9/2005 | Hurley et al. | 385/100 |
| 2005/0276559 | A1 * | 12/2005 | Bianchi | 385/134 |
| 2005/0281509 | A1 * | 12/2005 | Cox et al. | 385/59 |
| 2007/0292084 | A1 | 12/2007 | Gurreri et al. | |
| 2008/0240658 | A1 * | 10/2008 | Leeman et al. | 385/81 |
| 2009/0041411 | A1 * | 2/2009 | Melton et al. | 385/80 |
| 2009/0060423 | A1 * | 3/2009 | Melton et al. | 385/80 |
| 2009/0297104 | A1 | 12/2009 | Kachmar | |
| 2009/0310919 | A1 | 12/2009 | Arai et al. | |
| 2010/0254663 | A1 | 10/2010 | Hopkins et al. | |
| 2011/0002586 | A1 | 1/2011 | Nhep | |
| 2011/0116745 | A1 * | 5/2011 | Nishioka et al. | 385/60 |
| 2012/0257859 | A1 | 10/2012 | Nhep | |

FOREIGN PATENT DOCUMENTS

| | | |
|---|---|---|
| EP | 0 810 455 A1 | 12/1997 |
| EP | 0 916 974 A2 | 5/1999 |
| JP | 59-177513 | 10/1984 |
| JP | 61-284710 | 12/1986 |
| JP | 4-40402 | 2/1992 |
| JP | 2009-192908 | 8/2009 |
| WO | WO 97/23797 | 7/1997 |

* cited by examiner

FIBER OPTIC CONNECTOR WITH FIBER TAKE-UP REGION

CROSS-REFERENCE TO RELATED APPLICATIONS

This application is a continuation of U.S. patent application Ser. No. 12/849,633, filed Aug. 3, 3010, now abandoned, which is a divisional of U.S. patent application Ser. No. 12/433,081, filed Apr. 30, 2009, now U.S. Pat. No. 7,766,556, which is a divisional of U.S. patent application Ser. No. 11/735,267, filed Apr. 13, 2007, now U.S. Pat. No. 7,534,050, which applications are hereby incorporated by reference in their entireties.

TECHNICAL FIELD

The present invention relates to a fiber optic connector assembly, and more particularly, to a field terminatable fiber optic connector assembly.

BACKGROUND

The use of fiber optic networks as a signal-carrying medium for communications is now extremely widespread and continues to increase. Fiber optic networks frequently include a plurality of fiber optic cables having optical fibers. As fiber optic networks continue to grow, the need for optical fiber terminations for maintenance or expansion purposes is also growing. As such, there is a need for an optical fiber termination which can be used in the field in order to terminate an optical fiber or optical fibers.

SUMMARY

An aspect of the present disclosure relates to a fiber optic connector assembly comprising a connector and a carrier. The connector defines a longitudinal bore extending through the connector and has a first end region and an oppositely disposed second end region. The connector includes a ferrule assembly, which includes an optical fiber that extends through the connector, at least partially disposed in the longitudinal bore at the first end region, a tube, which has a first end portion disposed in the longitudinal bore at the second end region and an oppositely disposed second end region, and a spring disposed in the bore between the ferrule assembly and the tube. The tube defines a passage. The carrier includes a connector end engaged with the connector and an oppositely disposed cable end, a termination region disposed between the connector end and the cable end, a fiber support region disposed between the connector end and the termination region for supporting the optical fiber, and a take-up region disposed between the connector end and the fiber support region.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to further explain the principles of the invention. Other aspects of the present invention and many of the attendant advantages of the present invention will be readily appreciated as the present invention becomes better understood by reference to the following Detailed Description when considered in connection with the accompanying drawings, and wherein.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
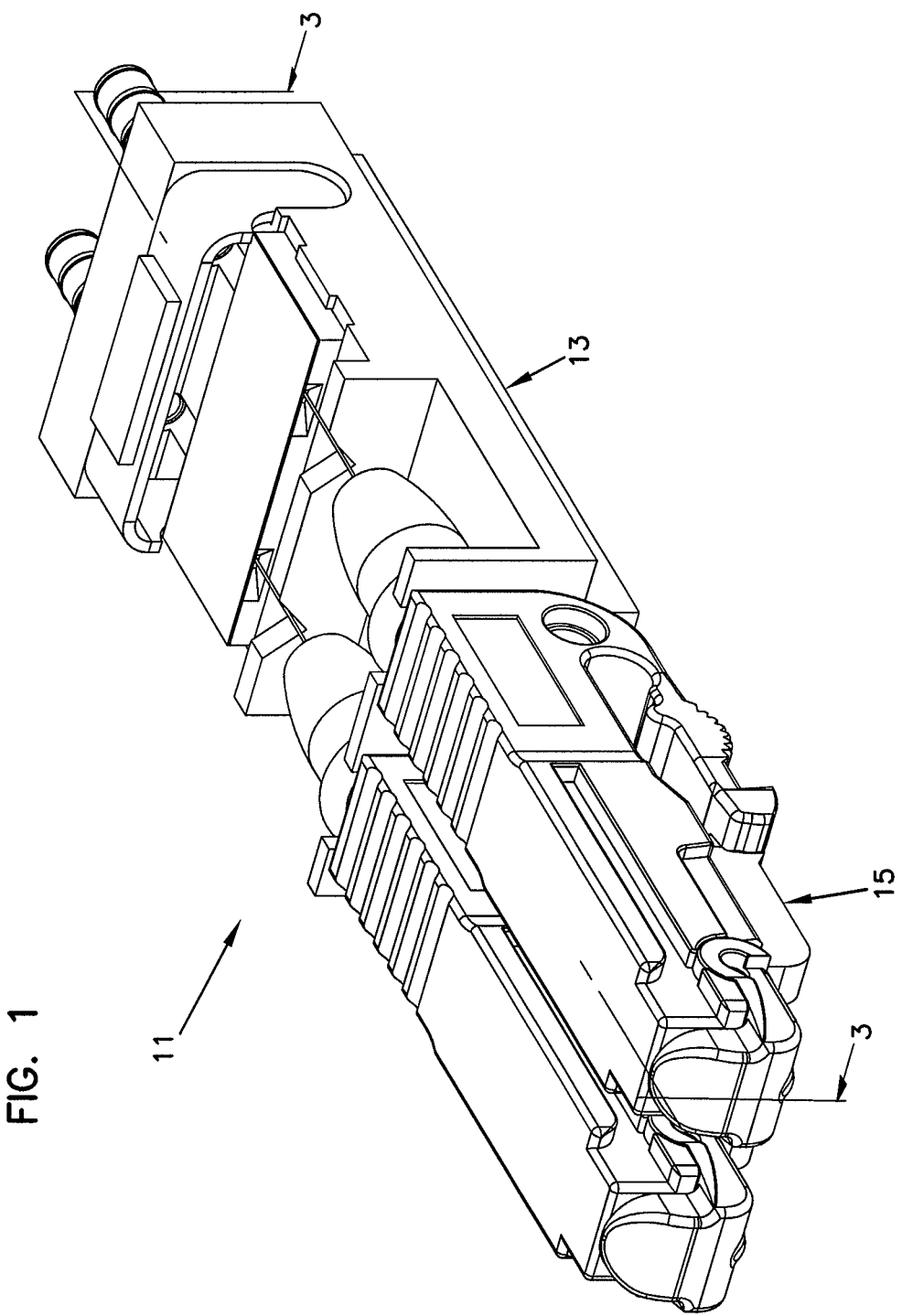
FIG. 1 is a perspective view of a fiber optic connector assembly made in accordance with the present invention.

Referring now to FIG. 1, a fiber optic connector assembly, generally designated 11, for use in field terminating an optical fiber or optical fibers is shown. The fiber optic connector assembly 11 includes a carrier, generally designated 13, and at least one connector, generally designated 15. While the connector 15 of the subject embodiment of the present invention will be described with regard to an LX.5 connector, which has been described in detail in U.S. Pat. Nos. 5,883,995 and 6,142,676 and hereby incorporated by reference, it will be understood by those skilled in the art that the scope of the present invention is not limited to the use of an LX.5-type connector. While the teachings of the present invention could be used with one or more connectors 15, the subject embodiment of the present invention will be described as having two connectors without intending any limitations on the scope of the present invention.

Figure 2:
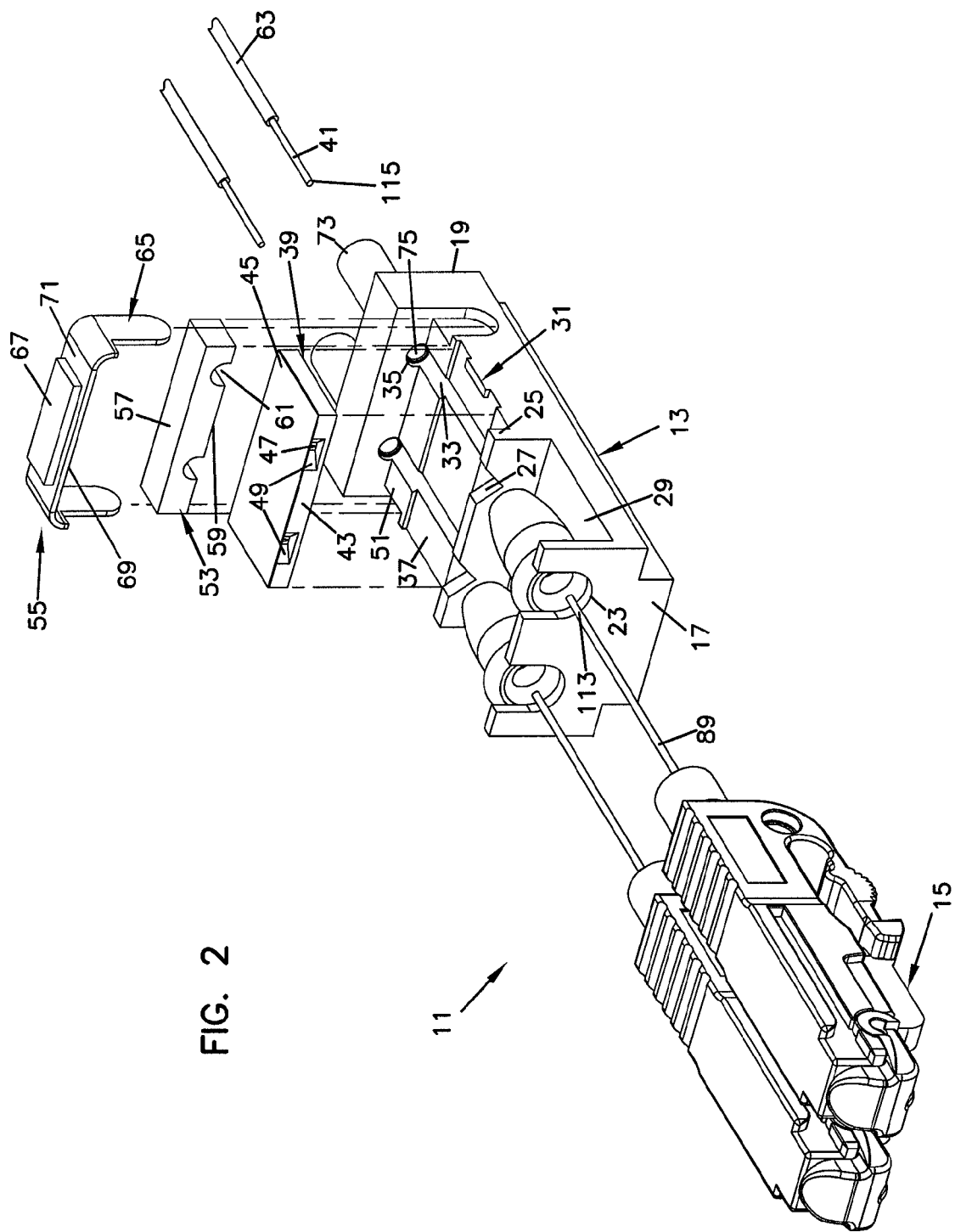
FIG. 2 is an exploded view of the fiber optic connector assembly of FIG. 1.

Referring now to FIG. 2, the carrier 13 will be described. The carrier 13 includes a connector end 17 and a cable end 19, which is oppositely disposed from the connector end 17. In the subject embodiment, the connector end 17 defines slots 23 for mounting the connectors 15. It will be understood by those skilled in the art, however, that the scope of the present invention is not limited to the carrier 13 defining slots 23 for mounting the connectors 15. Disposed between the connector end 17 and the cable end 19 of the carrier 13 is a fiber support region 25. In the subject embodiment, the fiber support region 25 includes guide ways 27 that narrow as the depth of the guide ways 27 in the fiber support region 25 increase. The carrier 13 further defines a take-up region 29, the purpose of which will be described subsequently, that is disposed between the connector end 17 and the fiber support region 25.

A termination region, generally designated 31, is disposed between the cable end 19 of the carrier 13 and the fiber support region 25. The termination region 31 of the carrier 13 defines guide paths 33 that are generally aligned with the guide ways 27 and crimp tube holes 35 defined by the cable end 19. In the subject embodiment, the guide paths 33 narrow as the depth of the guide paths 33 in the termination region 31 increase. The termination region 31 further defines a cavity 37. The cavity 37 is adapted to receive a V-groove chip, generally designated 39.

The V-groove chip 39 in the fiber optic connector assembly 11 serves as the location for the termination of the cleaved optical fibers 41. The V-groove chip 39 includes a base 43 and a cover 45. The base 43 defines V-grooves 47 that support the cleaved optical fibers 41. Cones 49 are disposed on either side of the V-grooves 47 in order to assist in the insertion of the cleaved optical fibers 41 into the V-grooves 47. In the subject embodiment, the base 43 is made of a silicon material while the cover 45 is made of a transparent material such as pyrex. The cover 45 is bonded to the base 43.

The termination region 31 in the carrier 13 includes an adhesive region 51 disposed between the cavity 37 and the cable end 19. Disposed in the adhesive region 51 is a heat responsive adhesive element, generally designated 53, and a saddle assembly, generally designated 55. In the subject embodiment, the heat responsive adhesive element 53 is a glue pellet 53. The glue pellet 53 is shown as being generally rectangular in shape, although it will be understood by those skilled in the art that the scope of the present invention is not limited to the glue pellet 53 being rectangular in shape. The glue pellet 53 includes a first surface 57 and an oppositely disposed second surface 59. At least one pathway 61 is preformed in the glue pellet 53. In the subject embodiment, the at least one pathway 61 is a channel 61 that is pre-formed in the second surface 59 of the glue pellet 53. In the preferred embodiment, two channels 61 are pre-formed in the second surface 59. The channels 61 are adapted to receive a portion of the cleaved optical fibers 41 and a portion of buffers 63, which surround the cleaved optical fibers 41. In the subject embodiment, each of the channels 61 is arcuately shaped so as to conform to the outer surface of the buffers 63.

In the subject embodiment, the saddle assembly 55 includes a saddle, generally designated 65, and a resistor 67. The glue pellet 53 is in thermally conductive contact with the saddle 65, which is in thermally conductive contact with the resistor 67. In the subject embodiment, the first surface 57 of the glue pellet 53 is in contact with a bottom surface 69 of the saddle 65, thereby establishing the thermally conductive contact between the glue pellet 53 and the saddle 65. The resistor 67 is in contact with a top surface 71 of the saddle 65, thereby establishing the thermally conductive contact between the resistor 67 and the saddle 65. A portion of the outer surface of each buffer 63 is disposed in channels 61 of the glue pellet 53. In the subject embodiment, nearly half of the outer circumference of the outer surface of the buffers 63 is disposed in the channels 61.

The carrier 13 further includes crimp tubes 73, which are engaged with the cable end 19 of the carrier 13. In the subject embodiment, the crimp tubes 73 are in a press-fit engagement with the crimp tube holes 35 in the cable end 19 of the carrier 13. The crimp tubes 73 define passageways 75 through which the cleaved optical fibers 41 are inserted. Strength members/layers (e.g., Kevlar) of a fiber optic cable can be crimped outside the crimp tube 73 for securing the fiber optic cable.

Figure 3:
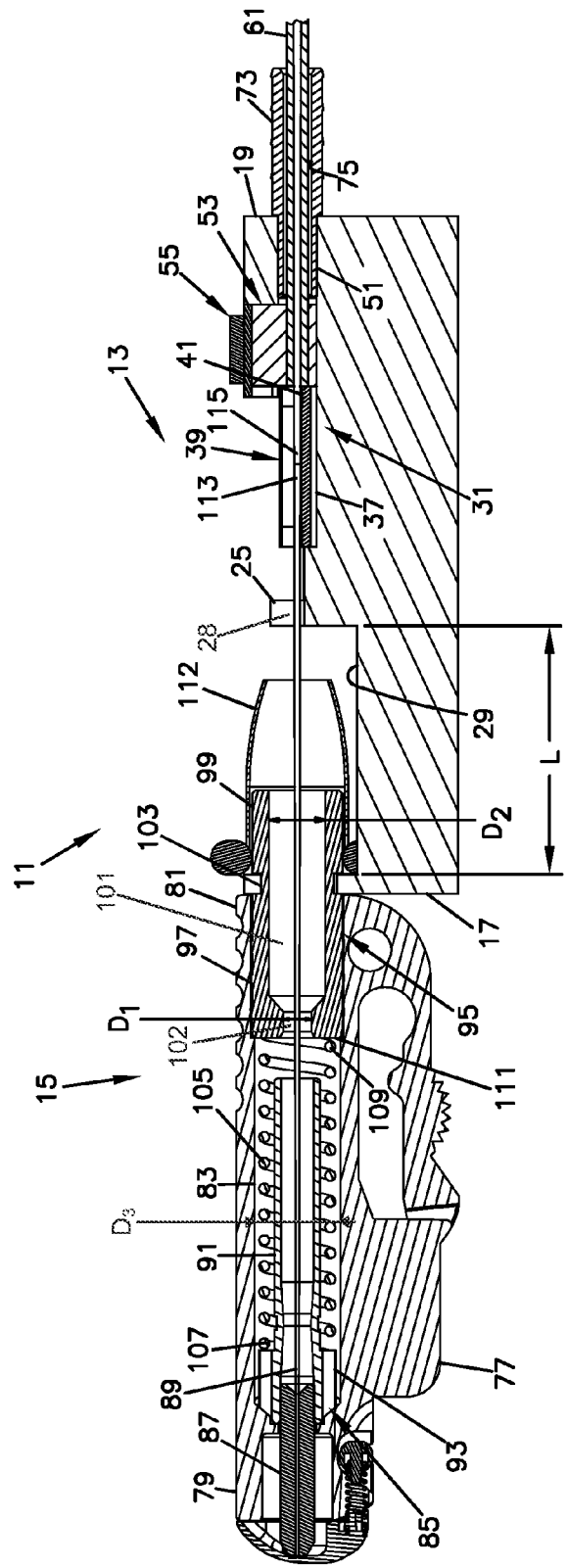
FIG. 3 is a cross-sectional view of the fiber optic connector assembly taken on line 3-3 of FIG. 1.

Referring now to FIG. 3, the connector 15 will be described. The connector 15 includes a main body 77 having a front end region 79 and an oppositely disposed back end region 81. The main body 77 defines a longitudinal bore 83, with an inner diameter $D_3$, that extends through the front and back end regions 79, 81. A ferrule assembly, generally designated 85, includes a ferrule 87, an optical fiber 89, a portion of which is housed in the ferrule 87, and a hub 91 having a flange 93 connectedly engaged with the ferrule 87. The ferrule assembly 85 is disposed in the longitudinal bore 83 of the connector 15 such that the ferrule 87 is positioned in the front end region 79 of the main body 77.

The connector 15 further includes a tube, generally designated 95. The tube 95 has a first end portion 97 and an oppositely disposed second end portion 99 and defines a passage 101 through the tube 95. The first end portion 97 of the tube 95 is connectedly engaged with the longitudinal bore 83 at the back end portion 81 of the main body 77. In the subject embodiment, the connected engagement between the tube 95 and the main body 77 is a press-fit engagement. In the subject embodiment, an inner diameter $D_1$ of the passage 101 at the first end portion 97 of the tube 95 is smaller than an inner diameter $D_2$ of the passage 101 at the second end portion 99. The purpose for the difference in the inner diameters $D_1$, $D_2$ of the passage 101 between the first and second end portions 97, 99, respectively, will be described subsequently. The tube 95 further includes an annular groove 103 disposed in the outer surface of the tube 95 between the first end portion 97 and the second end portion 99.

Disposed between the ferrule assembly 85 and the tube 95 is a spring 105. A first end 107 of the spring 105 abuts the flange 93 of the hub 91 while an oppositely disposed second end 109 of the spring 105 abuts an end surface 111 i.e., a spring stop) of the first end portion 97 of the tube 95. While the spring 105 biases the ferrule assembly 85 toward the front end region 79 of the main body 77, the spring 105 allows for axial movement of the ferrule assembly 85 within the longitudinal bore 83 (i.e., a spring cavity). In the subject embodiment, and by way of example only, the spring 105 allows for at least 1 mm of axial movement of the ferrule assembly 85.

With the ferrule assembly 85, tube 95, and spring 105 disposed in the main body 77, the connector 15 can be connected to the carrier 13. To connect the connector 15 to the carrier 13, the connector 15 is inserted into the slot 23 of the carrier 13 such that the slot 23 is disposed in the annular groove 103 of the tube 95. In the subject embodiment, the annular groove 103 is in a press-fit engagement with the slot 23. With the connector 15 engaged with the carrier 13, dust boots 112 are inserted over fiber ends 113 of the optical fibers 89, which extend through the longitudinal bore 83 of the main body 77 and the passage 101 of the tube 95. The dust boots 112 are in tight-fit engagement with the second end portion 99 of the tube 95. The fiber ends 113 of the optical fibers 89 are then inserted through the cones 49 of the V-groove chip 39 and into the V-grooves 47. With the fiber ends 113 of the optical fibers 89 inserted into the V-grooves 47 of the V-groove chip 39, the optical fibers 89 are secured to the guide ways 27 of the fiber support region 25. In the subject embodiment, the optical fibers 89 are affixed to the guide ways 27 with an epoxy thereby forming a fiber constraint 28. The affixation of the optical fibers 89 in the guide ways 27 prevents the fiber ends 113 of the optical fibers 89 from moving axially within the V-grooves 47 of the V-groove chip 39.

As stated previously, the spring 105 allows the ferrule assembly 85 to move axially within the longitudinal bore 83 of the main body 77 toward the carrier 13. With the optical fibers 89 affixed to the guide ways 27 of the fiber support region 25, the axial movement of the ferrule assembly 85 causes the optical fibers 89 to bend between the fiber support region 25 and the ferrule 87. However, if this bend has a radius that is smaller than the minimum recommended bend radius of the optical fibers 89, damage to the optical fibers 89 will result.

Two dimensions in the fiber optic connector assembly 11 are important in ensuring that the optical fibers 89 do not have a bend radius below minimum recommendations. The first dimension is the inner diameter $D_2$ of the passage 101 (i.e., a fiber take-up cavity). As the inner diameter $D_2$ of the passage 101 decreases, the number of bends in the optical fiber 89 increases. However, as the number of bends increase, the radii of each bend in the optical fiber 89 decreases. Therefore, there is a directly proportional relationship between the inner diameter $D_2$ of the passage 101 (i.e., the fiber take-up cavity) and the bend radius in the optical fiber 89. The second dimension is a length L of the take-up region 29. As the length L increases, the radii of the bends of the optical fibers 89 increases. Therefore, there is a directly proportional relationship between the length L and the bend radius of the optical fiber 89.

In the subject embodiment, the inner diameter $D_2$ of the passage 101 (i.e., the fiber take-up cavity) must be sized appropriately to account for the axial movement of the ferrule assembly 85 and the length L of the take-up region 29. If the length L of the take-up region 29 is long, the inner diameter $D_2$ of the passage 101 (i.e., the fiber take-up cavity) can be smaller since the bend radius of the optical fibers 89 will be large. On the other hand, if the length L of the take-up region 29 is short, the inner diameter $D_2$ of the passage 101 (i.e., the fiber take-up cavity) must be larger to avoid the bend radius of the optical fibers 89 being below the minimum recommendations.

As stated previously, the spring 105 abuts the end surface 111 (i.e., the spring stop) of the first end portion 97 of the tube 95. In order to have a proper surface against which the spring 105 would act, the end surface 111 of the first end portion 97 of the tube 95 must have sufficient surface area to support the spring 105. Therefore, in order to provide a sufficient surface area to support the spring 105, the inner diameter of the passage 101 should be small. As stated above, the inner diameter $D_2$ of the passage 101 could be reduced if the length L of the take-up region 29 was sufficiently long. This would result, however, in the fiber optic connector assembly 11 having a longer overall length, which is not desirable in some applications. Therefore, the subject embodiment resolves this dimensional conflict by having the inner diameter $D_1$ at the first end portion 97 of the tube 95 smaller than the inner diameter $D_2$ at the second end portion 99 of the tube 95 thereby forming a necked-down opening 102. In the subject embodiment, and by way of example only, with the ferrule assembly 85 having an axial movement of at least 1 mm in the longitudinal bore 83, the inner diameter $D_1$ is about 950 μm while the inner diameter $D_2$ is about 3 mm (or about three times greater than the inner diameter $D_1$). By having the inner diameter D2 at the second end portion 99 of the tube 95 larger than the inner diameter D1 at the first end portion 97 of the tube 95, the fiber optic connector assembly 11 can be more compact.

Referring now to FIGS. 2 and 3, the use of the fiber optic connector assembly 11 for a field termination will be described. With the connector 15 engaged to the carrier 13, the optical fiber 89 affixed in the guide way 27 of the fiber support region 25, and the fiber ends 113 inserted into the V-groove 47 of the V-groove chip 39, a cleaved end 115 of the cleaved optical fiber 41 is inserted into the passageway 75 of the crimp tube 73. The cleaved end 115 of the cleaved optical fiber 41 is inserted through the channel 61 of the glue pellet 53 and into the V-groove 47 of the V-groove chip 39. In the subject embodiment, an index matching gel is disposed between the cleaved end 115 of the cleaved optical fiber 41 and the fiber end 113 of the optical fiber 89. The index matching gel has an index of refraction that matches the index of refraction of the glass of the optical fiber 89 and the cleaved optical fiber 41.

With the cleaved end 115 of the cleaved optical fiber 41 inserted into the V-groove 47, optical radiation is passed through the optical fibers 89 to assess proper alignment of the fiber end 113 and the cleaved end 115. If optical radiation is detectable at the junction of the fiber end 113 and the cleaved end 115 as viewed through the transparent cover 45 of the V-groove chip 39, then the alignment/abutment is not correct.

The cleaved end 115 may have to be polished or cleaned and reinserted into the V-groove 47. If little to no radiation is detectable at the junction of the fiber end 113 and the cleaved end 115, then the cleaved optical fiber 41 and the buffer 63 can be secured to the fiber optic connector assembly 11 by the glue pellet 53. To secure the cleaved optical fiber 41 and the buffer 63 to the fiber optic connector assembly 11, an electrical power source is connected to the resistor 67. Electrical current is passed through the resistor 67 which heats up the glue pellet 53 by way of the thermally conducting saddle 65. As the glue pellet 53 heats up, the glue pellet 53 becomes tacky and adheres to the buffer 63 and the cleaved optical fibers 41 and closes passageways 75 of the crimp tubes 73. When the current is interrupted, the glue pellet 53 resets to secure the buffers 63 and the cleaved optical fibers 41 in their correct position in alignment with the optical fibers 89.

With the cleaved optical fibers 41 secured, the fiber optic connector assembly 11 can be provided as an insert for a housing to protect the fiber optic connector assembly 11 from damage. One housing in which the fiber optic connector assembly 11 can be inserted is described in U.S. Pat. No. 7,490,994, hereby incorporated by reference.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A fiber optic connector assembly comprising:
a connector body extending from a front end to a rear end, the connector body defining a first longitudinal bore with a first cross-dimension;
a ferrule assembly at least partially disposed within the first longitudinal bore of the connector body, the ferrule assembly including a ferrule and a ferrule spring that biases a rear end of the ferrule towards the front end of the connector body, the ferrule spring enabling the ferrule to move forwardly and rearwardly within the connector body along at least one millimeter of axial movement;
an optical fiber that extends rearwardly from the ferrule and through the rear end of the connector body;
a take-up region through which the optical fiber extends, the take-up region including a second longitudinal bore with a second cross-dimension, the take-up region positioned rearwardly of the ferrule spring and configured to accommodate bending of the optical fiber as the ferrule is moved rearwardly along the at least one millimeter of axial movement; and
an opening through which the optical fiber extends, the opening positioned between the first longitudinal bore and the second longitudinal bore, and the opening defining a third cross-dimension that is smaller than the first cross-dimension and that is also smaller than the second cross-dimension.

2. The fiber optic connector assembly of claim 1, wherein the connector body defines is cavity at the rear end of the connector body, the cavity defining at least part of the take-up region so that the optical fiber bends within the second longitudinal bore as the ferrule is moved along the at least one millimeter of axial movement.

3. The fiber optic connector assembly of claim 2, further comprising a tube that is mounted within the connector body to at least partially define the cavity.

4. The fiber optic connector assembly of claim 3, wherein the tube also is disposed within the first longitudinal bore of the connector body, the tube further defining the opening.

5. The fiber optic connector assembly of claim 3, further comprising a boot coupled to the rear end of the connector body, wherein the boot also defines part of the take-up region.

6. The fiber optic connector assembly of claim 1, wherein the third cross-dimension is 950 μm.

7. The fiber optic connector assembly of claim 6, wherein the second cross-dimension is 3 millimeters.

8. The fiber optic connector assembly of claim 1, further comprising a carrier having is connector end engaged with the connector body, an oppositely disposed cable end, a termination region disposed between the connector end and the cable end, and a fiber support region disposed between the connector end and the termination region for supporting the optical fiber.

9. The fiber optic connector assembly of claim 8, wherein the carrier defines at least part of the take-up region.

10. The fiber optic connector assembly of claim 9, wherein a V-groove chip is disposed in the termination region of the carrier.

11. The fiber optic connector assembly of claim 9, wherein a heat responsive adhesive element is disposed in the termination region of the carrier.

12. The fiber optic connector assembly of claim 1, wherein the ferrule includes a front end that is positioned opposite the rear end of the ferrule and wherein the front end of the ferrule extends forwardly beyond the front end of the connector body.

13. The fiber optic connector assembly of claim 1, wherein the connector body includes a spring stop that supports the ferrule spring and wherein the spring stop is positioned between the ferrule spring and the take-up region.

14. The fiber optic connector assembly of claim 13, wherein the opening is positioned rearwardly adjacent the spring stop and forwardly adjacent the take-up region and wherein the opening guides the bending of the optical fiber within the take-op region.

15. The fiber optic connector assembly of claim 14, wherein a fiber constraint is positioned rearwardly adjacent the take-up region at a fiber constraint position and wherein the fiber constraint also guides the bending of the optical fiber within the take-up region.

16. The fiber optic connector assembly of claim 15, wherein the opening and the fiber constraint are positioned opposite each other about the take-up region.

17. A fiber optic connector assembly comprising:
a connector body extending along a longitudinal axis between a front end and a rear end, the connector body defining a first longitudinal bore with a first cross-dimension;
a ferrule assembly at least partially disposed within the first longitudinal bore of the connector body, the ferrule assembly including a ferrule and a ferrule spring that biases the ferrule in a direction along the longitudinal is from the rear end of the connector body toward the front end of the connector body, the ferrule adapted to move forwardly and rearwardly along a full range of movement of the ferrule along the longitudinal axis;
an optical fiber that extends rearwardly from the ferrule and through the rear end of the connector body;
a take-up region through which the optical fiber extends, the take-up region including a second longitudinal bore with a second cross-dimension, the take-up region positioned rearwardly of the ferule spring and configured to accommodate bending of the optical fiber and thereby take-up excess fiber length of the optical fiber corresponding to the full range of movement of the ferrule as the ferrule is moved rearwardly; and
an opening through which the optical fiber extends, the opening positioned between the ferrule spring and the take-up region, and the opening defining a third cross-dimension that is smaller than the first cross-dimension and that is also smaller than the second cross-dimension.

18. The fiber optic connector assembly of claim 17, wherein the connector body includes a spring stop that supports the ferrule spring and wherein the spring stop is positioned between the ferrule spring and the take-up region.

19. The fiber optic connector assembly of claim 17, wherein the ferrule assembly further includes a hub that supports the ferrule.

20. The fiber optic connector assembly of claim 18, wherein the ferrule assembly further includes a hub that supports the ferrule and wherein the ferrule spring is captured between the hub and the spring stop.

21. The fiber optic connector assembly of claim 18, wherein the opening is positioned rearwardly adjacent the spring stop and forwardly adjacent the take-up region and wherein the opening guides the bending of the optical fiber within the take-up region.

22. The fiber optic connector assembly of claim 21, wherein a fiber constraint is positioned rearwardly adjacent the take-up region at a fiber constraint position and wherein the fiber constraint also guides the bending of the optical fiber within the take-up region.

23. The fiber optic connector assembly of claim 22, wherein the opening and the fiber constraint are positioned opposite each other about the take-up region.

24. The fiber optic connector assembly of claim 17, wherein the take-up region is positioned within the connector body.

25. A fiber optic connector assembly comprising:
a spring cavity defining a first cross-dimension;
a fiber take-up cavity defining a second cross-dimension;
a necked-down opening between the spring cavity and the fiber take-up cavity, the necked-down opening defining a third cross-dimension that is smaller than the first cross-dimension and that is also smaller than the second cross-dimension;
a ferrule assembly at least partially disposed within the spring cavity, the ferrule assembly including a ferule and a ferrule spring that biases the ferule in a direction away from the fiber take-up cavity, the ferrule adapted to move forwardly and rearwardly along a full range of movement of the ferule along a longitudinal axis of the ferrule; and
an optical fiber that extends rearwardly from the ferrule and through the spring cavity, the necked-down opening, and the fiber take-up cavity;
wherein when the ferrule is moved rearwardly, the optical fiber bends within the fiber take-up cavity and thereby takes-up excess fiber length of the optical fiber corresponding to rearward movement of the ferrule.

26. The fiber optic connector assembly of claim 25, wherein the necked-down opening guides bending of the optical fiber within the fiber take-up cavity.

27. The fiber optic connector assembly of claim 26, wherein a fiber constraint is positioned rearwardly adjacent the fiber take-up cavity at a fiber constraint position and wherein the fiber constraint also guides the bending of the optical fiber within the fiber take-up cavity.

28. The fiber optic connector assembly of claim 25, wherein the third cross-dimension is one-third of the second cross-dimension.

29. The fiber optic connector assembly of claim 25, wherein the third cross-dimension is 950 μm.

* * * * *

UNITED STATES PATENT AND TRADEMARK OFFICE
CERTIFICATE OF CORRECTION

| | | |
|---|---|---|
| PATENT NO. | : 8,944,702 B2 | |
| APPLICATION NO. | : 13/455249 | |
| DATED | : February 3, 2015 | |
| INVENTOR(S) | : Kachmar | |

It is certified that error appears in the above-identified patent and that said Letters Patent is hereby corrected as shown below:

In the claims

Col. 6, line 57, claim 2: "defines is cavity" should read --defines a cavity--

Col. 7, line 9, claim 8: "having is connector end" should read --having a connector end--

Col. 7, line 53, claim 17: "along the longitudinal is" should read --along the longitudinal axis--

Signed and Sealed this
Fifth Day of May, 2015

Michelle K. Lee
*Director of the United States Patent and Trademark Office*